United States Patent [19]

Tulplue et al.

[11] Patent Number: 4,774,709

[45] Date of Patent: Sep. 27, 1988

[54] SYMMETRIZATION FOR REDUNDANT CHANNELS

[75] Inventors: Bhalchandra R. Tulplue, Vernon; Robert E. Collins, East Hartford, both of Conn.

[73] Assignee: United Technologies Corporation, Hartford, Conn.

[21] Appl. No.: 914,697

[22] Filed: Oct. 2, 1986

[51] Int. Cl.⁴ .............................................. G06F 11/18
[52] U.S. Cl. ........................................ 371/11; 371/68
[58] Field of Search ............... 371/8, 9, 11, 16, 36, 371/68; 364/200 MS File, 900 MS File

[56] References Cited

U.S. PATENT DOCUMENTS

| | | | |
|---|---|---|---|
| 3,805,235 | 4/1974 | Foster | 371/36 |
| 3,882,456 | 5/1975 | Takada | 371/8 |
| 4,347,563 | 8/1982 | Paredes | 371/11 X |
| 4,497,059 | 1/1985 | Smith | 371/36 |
| 4,627,055 | 12/1986 | Mori | 371/11 X |
| 4,658,359 | 4/1987 | Palatucci | 371/11 X |
| 4,661,310 | 4/1987 | Cook | 371/36 X |

*Primary Examiner*—Jerry Smith
*Assistant Examiner*—Robert W. Beausoliel
*Attorney, Agent, or Firm*—Francis J. Maguire, Jr.

[57] ABSTRACT

A plurality of redundant channels in a system each contain a global image of all the configuration data bases in each of the channels in the system. Each global image is updated periodically from each of the other channels via cross channel data links. The global images of the local configuration data bases in each channel are separately symmetrized using a voting process to generate a system signal configuration data base which is not written into by any other routine and is available for indicating the status of the system within each channel. Equalization may be imposed on a suspect signal and a number of "chances" for that signal to "heal" itself are provided before excluding it from future votes. Reconfiguration is accomplished upon detecting a channel which is deemed invalid. A reset function is provided which permits an externally generated reset signal to permit a previously excluded channel to be reincluded within the system. The updating of global images and-/or the symmetrization process may be accomplished at substantially the same time within a synchronized time frame common to all channels.

16 Claims, 3 Drawing Sheets

SYMMETRIZATION FOR REDUNDANT CHANNELS

The invention described herein was made in the performance of work under NASA Contract No. NAS2-11771 and is subject to the provisions of Section 305 of the National Aeronautics and Space Act of 1958 (72 Stat. 435; 42 U.S.C. 2457).

CROSS REFERENCE TO RELATED APPLICATION

The invention described herein may employ some of the teachings disclosed and claimed in commonly owned co-pending application filed on even date herewith by Tupule et al (Ser. No. 914698 filed 10-2-88), entitled AUTOEQUALIZATION IN REDUNDANT CHANNELS.

1. TECHNICAL FIELD

This invention relates to redundant control systems used for improving system availability in which individual channel transients sometimes cause nuisance shutdowns.

2. BACKGROUND ART

In critical control computer applications, the use of hardware redundancy is commonplace for improving the reliability of the system. It should be understood that usage of the word "redundant" herein includes not only strictly identical channels using identical sensors but also includes quasi-redundant channels in which either the sensors used or even the channels themselves may vary slightly between channels. In other words, some signals associated with a channel may not appear in other channels.

A variety of Redundancy Management (RM) techniques have been developed for meeting the twin objectives of a high degree of failure detection, isolation and alarm protection as well as avoidance of shutdown of a channel in the presence of a transient in that channel and isolation thereof. These RM algorithms invariably consist of cross channel voting planes for algorithmic Failure Detection and Isolation (FDI) supported by in-channel Built-In-Tests (BIT). These voting planes involve the application of comparison thresholds to the cross-strapped signals at various stages of control computations for signal selection and FDI.

The capabilities of FDI algorithms in terms of the probabilities of detection, isolation and alarms are a function of the detection threshold. Clearly, the smallest possible FDI threshold, namely zero, which requires bit-for-bit identicality under no failure conditions, is most desirable since it results in a very powerful algorithmic FDI with near perfect coverage due to the immediate detection and isolation of any non-identical signal. In the past, the application of zero FDI threshold at intermediate or output voting planes has proved impractical because of the large false alarm rate. The high false alarm rate is mainly due to the non-identical operation of the redundant channels which, in turn, is caused by the occurrence of asymmetrical or asynchronous events including transient faults. A common example of an asymmetrical event is the temporary loss of power to a subset of channels in a redundant control system. The occurrence of permanent faults can also lead to a asymmetrical or asynchronous channel operation but does not result in a false alarm because the persistently faulty signals are permanently voted out and the voting planes are reconfigured to only include the unaffected redundant channels in subsequent votes. In any case, there is a need for techniques that can eliminate the high false alarm rates associated with "tight" thresholds and guarantee identical channel operations in the presence of asymmetrical or asynchronous events and transient faults.

The techniques of operational frame synchronization, in which synchronized time frames are made common to all channels, and cross channel voting are presently considered adequate to guarantee identical operation of redundant channels. It is thought that, at least under no-fault conditions, the redundant channels can collect, cross-strap and vote on the redundant input signals in a synchronous manner and produce identical data bases in all channels. In this scenario, the occurrence of asymmetrical events and transients is handled by erecting additional voting planes.

DISCLOSURE OF THE INVENTION

The problem with the above thinking is that it fails to account for the fact that redundancy management voting planes are influenced not only by the signal data bases (redundant sets of input signals) but also by the configuration data bases. The configuration data bases contain information regarding the fault and redundancy levels of signals and channels.

Typically, these configuration data bases are historical in nature in that as faults accumulate they are added to the data base and not removed until specifically requested by a user of the system. The occurrence of such events and transients asymmetrically and permanently affects the channel configuration data bases which contain the health, status and FDI information on the redundant channels. For example, when a channel receives dissimilar data due to a transient fault on its data links it can result in a dissimilar output at the next or any subsequent voting plane which may persist for a long time due to historical effects of filters, etc. This, in turn, can lead to failure confirmation in the affected channel or channels. The same is true of dissimilar external events such as the loss of power to a subset of channels or the presence of simplex bus messages, e.g., MIL-STD-1553 messages, which can delay the updating of a channel's configuration data base and make its data bases appear "out of sync" with the others.

In any case, these divergent configuration data bases lead to output miscompares and channel shutdowns and are classified as false alarms because these "failed" channels can, in reality, be "reset" and made functional. It is a central teaching of the present invention that the problem of high false alarms associated with "tight" thresholds is closely linked with the problem of asymmetrical configuration data bases and that the problem can be solved by symmetrizing these configuration data bases and thereby eliminating the effects of asymmetrical events and transients on identical channel operations and outputs.

Therefore, the object of the present invention is to provide a method and apparatus by which redundant systems may be made more reliable or available and less subject to false alarms caused by non-symmetrical events occurring on one or more of the channels of such a redundant system.

According to the present invention, the signal health, status and FDI information generated at all voting planes in each channel of a plural channel system can be considered to be defining a local channel configuration data base (CCDB) which is communicated to all other channels digitally, e.g., via Cross Channel Data Link(s) (CCDL). Each channel has a storage area for storing duplicates of all of the other CCDBs in the system. Each channel also has a storage area for storing a duplicate of its own local CCDB. Each local CCDB is updated at random with signal data from its associated channel. The foreign CCDBs and duplicate local CCDB resident in each channel are periodically updated with signal data obtained from the corresponding local CCDBs in each of the other channels, including itself. This provides a consistent data base to the plurality of channels which is identical in all channels, in the absense of asymmetrical failures and events, and which in turn can be symmetrized, i.e., used to form identical system configuration data bases (SCDBs). Thus, all of the foreign CCDBs resident in a channel and the duplicate local CCDB may then be majority voted to produce a System Configuration Data Base (SCDB) indicative, for each redundant signal group, of the majority of channels in which the signal configuration data is identical and those signals, therefore, are deemed valid. If one or more bad channels are detected, the plural channel system is reconfigured to include only those majority of channels both previously and presently valid.

In further accord with the present invention, before excluding a non-identical signal or misoperating channel, that signal or channel is "equalized" to the corresponding signal valid or CCDB determined from the majority of signals or CCDBs. If the errant signal or channel continues to misbehave after a selected number of periodic determinations of miscomparison, the system is then reconfigured to exclude the signal or channel in which the non-identical signal or CCDB is persistently different.

In still further accord with the present invention, the periodic updating of each of the foreign and duplicate local CCDBs in each channel is accomplished substantially at the same relative time within each frame of a repetitive series of synchronized computational time frames common to all channels.

In still further accord with the present invention, the periodic comparison of the signal configuration data contained in the various CCDBs within a channel is accomplished substantially at the same relative time within each frame of a repetitive series of synchronized computational time frames common to all channels.

In still further accord with the present invention, the duplicate local CCDB in each channel is updated from its own local CCDB by communicating the present signal configuration data content thereof externally via a route and environment similar to that used to communicate the present local signal data configuration content to foreign channels.

In still further accord with the present invention, a loss of power signal is sent from a channel in which a loss of power occurs to all of the plural channels in the system in order that the unaffected channels may stop using the affected channel's associated foreign CCDBs therein.

Except in a case of multiple simultaneous events, the present invention is guaranteed to produce an identical SCDB in each channel which is then used for driving all voting planes and control computations and producing identical selected signals and output commands.

The implementation of the data base symmetrization concept disclosed herein centers around an autonomous, synchronous controller embedded in each channel of a plural channel computer system. Such a channel's controller can be constructed as taught herein and is frame synchronized by a synchronizer. These autonomous controllers can be implemented as embedded processors or as programmable state machines driven by the local clock in each channel and may perform the digital transfer of information between link transmitters and receivers.

A key element of the present invention is the "frame" synchronous transmission of data to and from all redundant channels over the CCDL. The resulting cross channel data bases are frame synchronous and architecturally symmetrical in all channels and are guaranteed to produce identical computations and outputs in the presence of asymmetrical events and transient failures.

The separation of a local channel's data into a local CCDB and a duplicate local CCDB provides a unique architecture which eliminates the potential time skew between receipt of data by other channels, over a serial CCDL and a much more rapid reception by a local channel via series or parallel data flow paths. As taught herein, each local channel will then generate an identical SCDB and use it at the voting planes and hence symmetry is ensured in the control computations and outputs.

The physical separation of the local channel's continuously updated CCDB from its global image, i.e., its duplicate local CCDB, resolves a potential race problem associated with the sharing of CCDBs. The potential race problem is solved architecturally and is a key teaching of the present invention.

The symmetrical data base architecture disclosed herein also contains a unique feature for protection of the global data bases by a common asymmetrical event, namely, the loss of power. When a subset of channels in a redundant system lose power the affected channels are naturally removed from the controlling system outputs. However, it is generally very important to ensure that this non-symmetrical event does not corrupt the channel's own data base in the other channels. Furthermore, it is absolutely necessary to inform the other channels instantaneously, and in an unmistakable manner, regarding the asymmetrical event so that their CCDBs and SCDBs are not corrupted. It is important to note that this cannot be guaranteed to be accomplished either explicitly by the affected powerless channels or implicitly by the unaffected channels via any monitoring mechanism. It must be done, according to the present invention, via an autonomous cross-strapped disable signal called loss of power (LOP) which interrupts the operations of other channels' processors and freezes the affected channel's CCDB image in the unaffected channels. This cross-strapped LOP signal is then used by the unaffected channels to reconfigure the signal configuration data bases without loss of symmetry and thus remove, symmetrically, the affected channels' signals from being used in future voting and control computations. This is another key teaching of the present invention.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
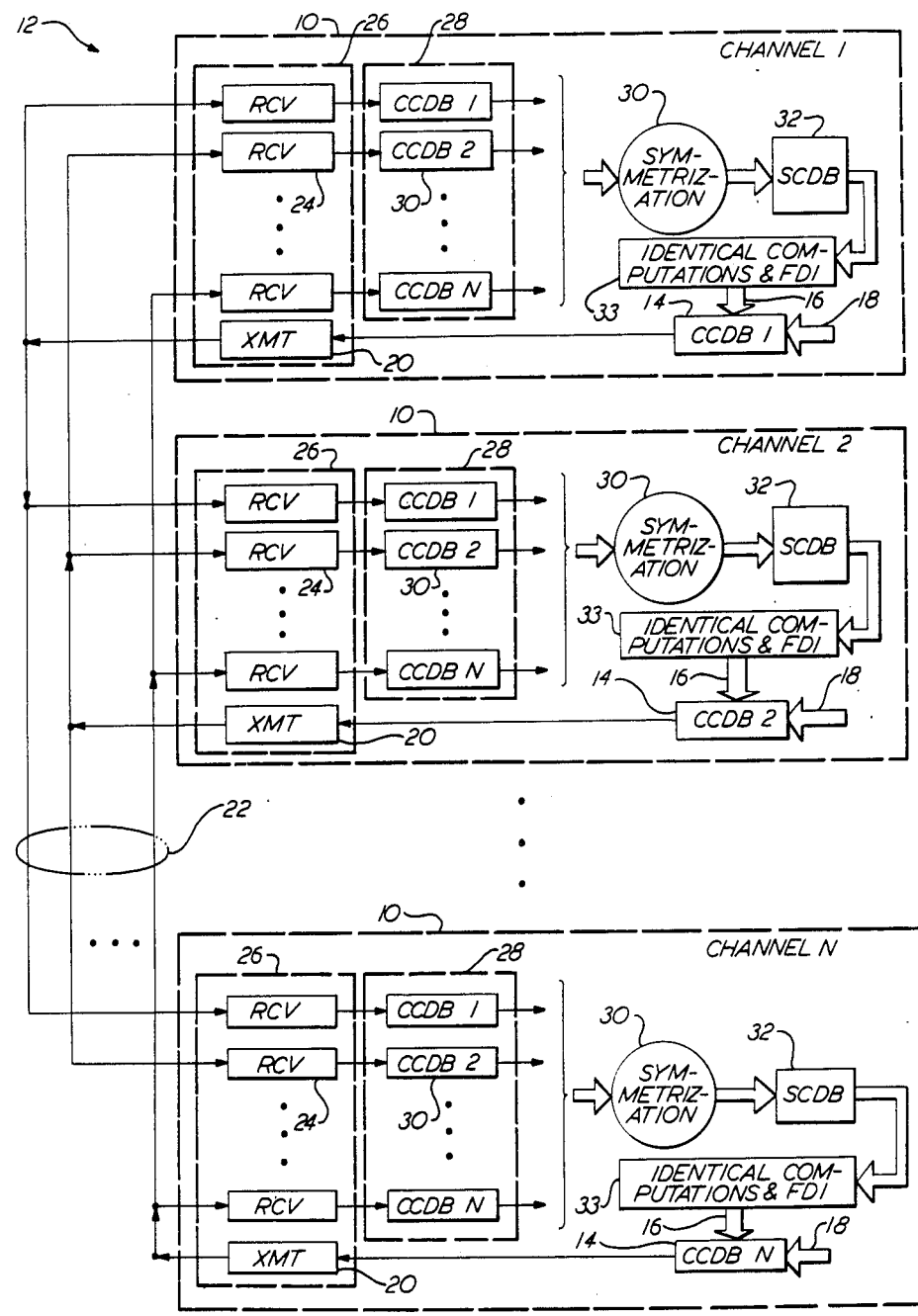
FIG. 1 is a simplified symmetrical system architecture illustrating symmetrized data flow in a plural channel system, according to the present invention.

FIG. 1 illustrates symmetrized data flow in a plural channel system having a symmetrical system architecture, according to the present invention. Each channel 10 of a multi-channel redundant system, on the basis of FDI and other routines, creates a local configuration data base 14 called the Channel Signal Configuration Data Base (CCDB), each consisting of a plurality of status words. Each status word indicates the fault and redundancy configuration level of one or more of the plural signals in the associated channel. One or more of the signals may indicate the redundancy status or "health" of the channels in the system. Each local CCDB receives data from various voting planes within its channel as indicated generally by an input signal on a line 16. Each local CCDB also receives data from asymmetrical events occurring in its channel, e.g., MIL-STD-1553 messages, LOP, etc., as symbolized by a signal line 18. Each channel transmits this local data base via a transmitter 20 over cross channel digital data links 22 to all channels in the multi-channel system. A plurality of receivers 24 are located in each channel, and may reside in a frame synchronous I/O controller 26 which may also include the transmitter 20. The receivers are responsive to the data sent over the cross channel data links (CCDLs) and, in turn, provide the updated data received to a global memory space 28 which includes a plurality of CCDBs which together consititute a global image of all the each local CCDBs in the system. It will be noted that each of the global images 28 contains a duplicate of its own local CCDB 14 which has been transmitted to itself over a route and environment similar to that of the foreign channel images or copies, e.g., over the CCDLs. This method of creating images or copies of CCDBs in all channels for every CCDB generated using the same medium for each is a key teaching of the present invention. This approach increases the probability that the data base copies used to generate the system data bases (SCDBs), as defined below, will be identical.

Each of the global CCDB images 28 are periodically symmetrized as shown symbolically in a symmetrization block 30 in each of the channels. The symmetrization process takes place in each channel at essentially the same time as it takes place in all of the channels. After symmetrization, a System Configuration Data Base (SCDB) is provided as indicated by an SCDB block 32 in each channel which in turn defines the (sub)-set of signals and channels available to the channel for performing identical computations and failure detection and isolation as indicated by a block 33. Only the Symmetrization routine is permitted to write into the SCDB and all other routines are only able to read the SCDB.

The symmetrization process consists, in part, of voting on the local data bases (CCDBs) received from all channels. The SCDB defines the status and configuration of system resources such as sensor sets and actuators. In addition, the SCDB contains configuration information which, together with the old SCDB, enables equalization and/or reconfiguration routines to change software gains, switch settings, signal management configuration, etc., for those channels in which it is determined that selected signals, switches, etc., require equalization and/or reconfiguration.

Figure 2:
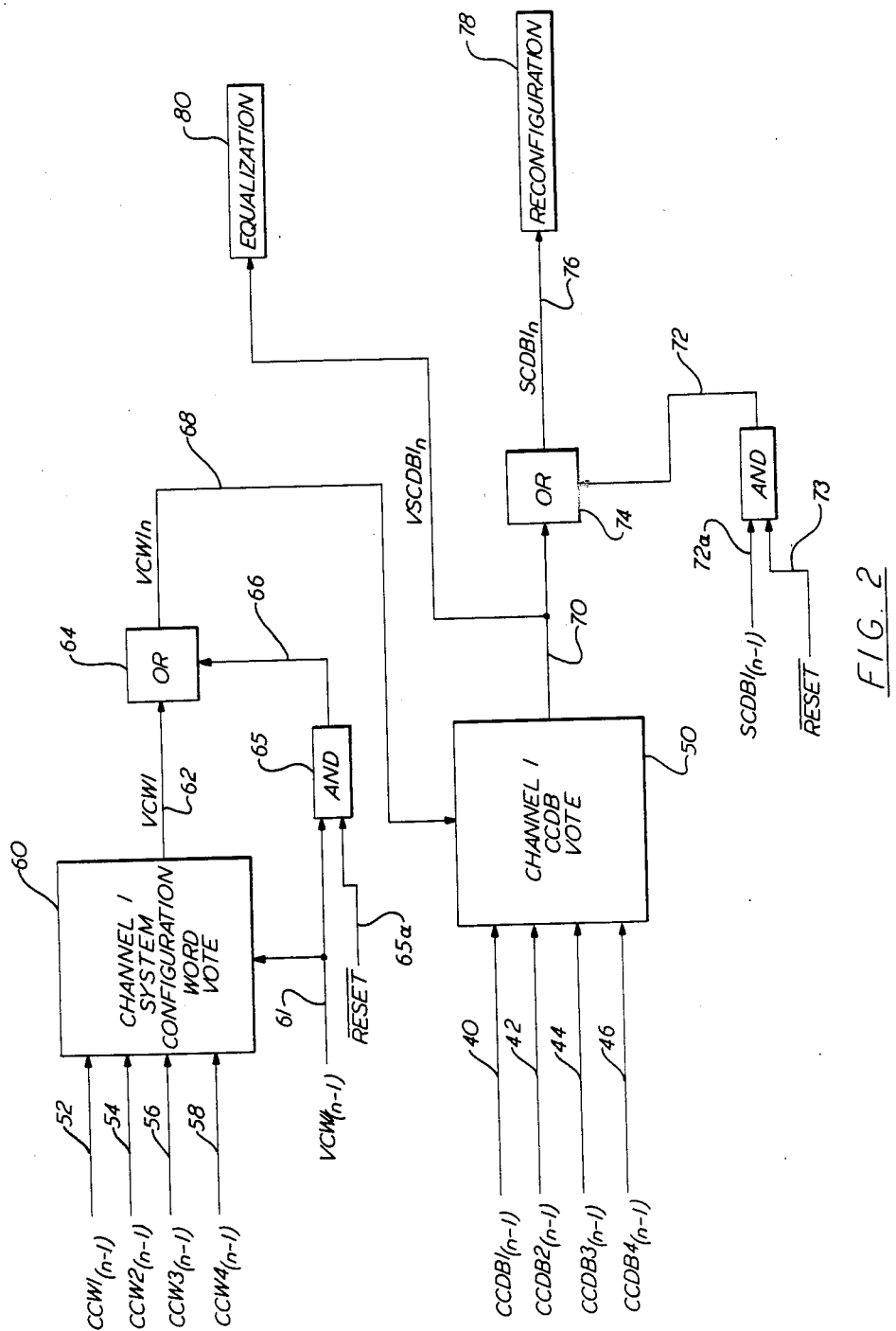
FIG. 2 is a simplified block diagram overview of the symmetrization process in an individual channel.

FIG. 2 illustrates the mechanization of symmetrization. The illustration of FIG. 2 is for a single channel, e.g., channel number 1 in a four channel system. A plurality of channel signal configuration data base (CCDB) signals on lines 40, 42, 44, 46 from, respectively, channels 1, 2, 3, 4 are received over the cross channel data links 22 of FIG. 1 and are presented to a channel 1 CCDB vote as indicated by a voting block 50. However, before voting, a System Configuration Word (SCW) or Voted Configuration Word (VCW) must be computed for selecting the channels whose data are valid. This is done by voting on the channel configuration words (CCWs) which indicate the channel's perception of the system configuration. The CCWs are an integral part of the corresponding CCDBs and are taken from each received CCDB as indicated on lines 52, 54, 56, 58 and presented to a System Configuration Word Vote in a voting block 60. The resultant Voted Configuration Word is compared to, or masked, by the previous Voted Configuration Word ($VCW1_{n-1}$), as indicated by a signal on a line 61, to prevent any channel previously deemed "bad" from "surreptitiously" or inadvertantly becoming deemed "good." Thus, each channel produces a preliminary Voted Configuration Word (VCW) as indicated in FIG. 2 by a VCW1 signal on a line 62 presented to an OR gate 64. The VCW signal on line 62 is based on channel 1's present "knowledge" of the system status. The purpose of the OR gate 64 is to make sure that the present VCW does not include status information which might inadvertently indicate restored "health" to a channel which was previously deemed bad in the absence of an externally generated RESET signal. An AND gate 65 is responsive to the $VCW_{n-1}$ signal on line 61 and to a not RESET signal on a line 65a which permits the old VCW signal on line 61 to get through to OR gate 64 in the absence of an externally generated reset request. If a reset request is present, all channels are permitted to participate in the upgrading of the VCW1 of block 60 to the $VCW1_n$ of block 64 via a majority vote without the masking of block 64. Thus, the previous VCW, as indicated by a signal on a line 66 (assuming no reset request is present) is ORed with the VCW on the line 62. The resulting $VCW1_n$ signal on a line 68 is therefore a result of the masked SCW vote executed in voting block 60, i.e., taking into account the VCW from the last cycle in conjunction with the presence or absence of a reset request, in order to determine which channels are to be included in the CCDB vote in voting block 50.

Upon receiving the $VCW_n$ signal on line 68, voting may proceed in voting block 50 to produce a Voted System Configuration Data Base (SCDB) signal on a line 70. The VSCDB on line 70 is ORed with the previous cycle's System Configuration Data Base in a manner similar to the operation of the block 64 and is indicated by a signal on a line 72 presented to an OR gate 74 also responsive to the VSCDB on line 70. The $SCDB_{n-1}$ signal on the line 72 is identical to a similar signal on a line 72a only if no external reset has been requested, as indicated by a not RESET signal on a line 73. The resulting output signal from the OR gate 74 is the present $SCDB_n$ on a line 76. If there has been a degradation in a channel from the last cycle the channel must be reconfigured as indicated by a reconfiguration block 78. This will compare the present SCDB with that of the previous cycle and if a change is detected there will be necessary changes made to the gains, switches, etc., in the remaining "healthy" channels. Thus, if there is a quad redundant system and one of the channels is detected bad, there will only be three channels now sharing the output load and the output gains must be adjusted accordingly to reflect the reduction from four channels to three. For example, if each channel contributed 25% of the electrical current driving an actuator, the remaining channels must now contribute $33\frac{1}{3}$% each. Of course, the switches associated with the bad channel must be opened to ensure isolation of the bad channel.

It is of course advantageous to give a channel which has been detected "bad" one or more additional "chances" to "heal" itself so that reconfiguration is not necessary. An equalization block 80 is shown in FIG. 2 for that purpose. Upon detecting a channel in a "bad" condition, that channel's data is made the same as that of the good channel and it is allowed to recommence computations on the presumably good data. If it continues to diverge after a selected number of cycles the reconfiguration process indicated by block 78 is permitted to proceed in order to eliminate the bad channel.

In general, it is possible that the $SCDB_n$ created by the majority vote of the data in the SCDBs received from all the authorized channels as defined by the current $VCW_n$ may include certain status information which is peculiar to individual channels and therefore is not symmetrized. It can simply be appended to the SCDB (not shown).

The voting algorithm to be applied to each word in the CCDBs may be, for example, an (n-1)/n vote which will vary depending on the number of redundant channels. For example, for a quadraplex system where the $VCW_n$ is equal to 0000 (indicating that all channels are presently good), the vote would combine the four CCDB words (designated A, B, C, D) by ORing them in the following combination:

ABC+BCD+ACD+ABD.

For a quadraplex system in which one of the channels has gone bad ($VCW_n$=0001 or 0010 or 0100 or 1000), the vote might be as follows (assuming D is bad):

AB+BC+AC.

In case of a degradation down to a duplex level ($VCW_n$=0011 or 0101 or 0110 or 1001 or 1010 or 1100), the CCDBs might be voted as follows (assuming C and D are bad):

A+B.

For a case where three channels have gone bad ($VCW_n$=0111 or 1011 or 1101 or 1110), the voting might be as follows (assuming B, C, and D are bad):

A.

For the case were all channels are off-line (VCW=1111), the SCDB in each channel is set equal to the corresponding status word in the CCDB.

Figure 3:
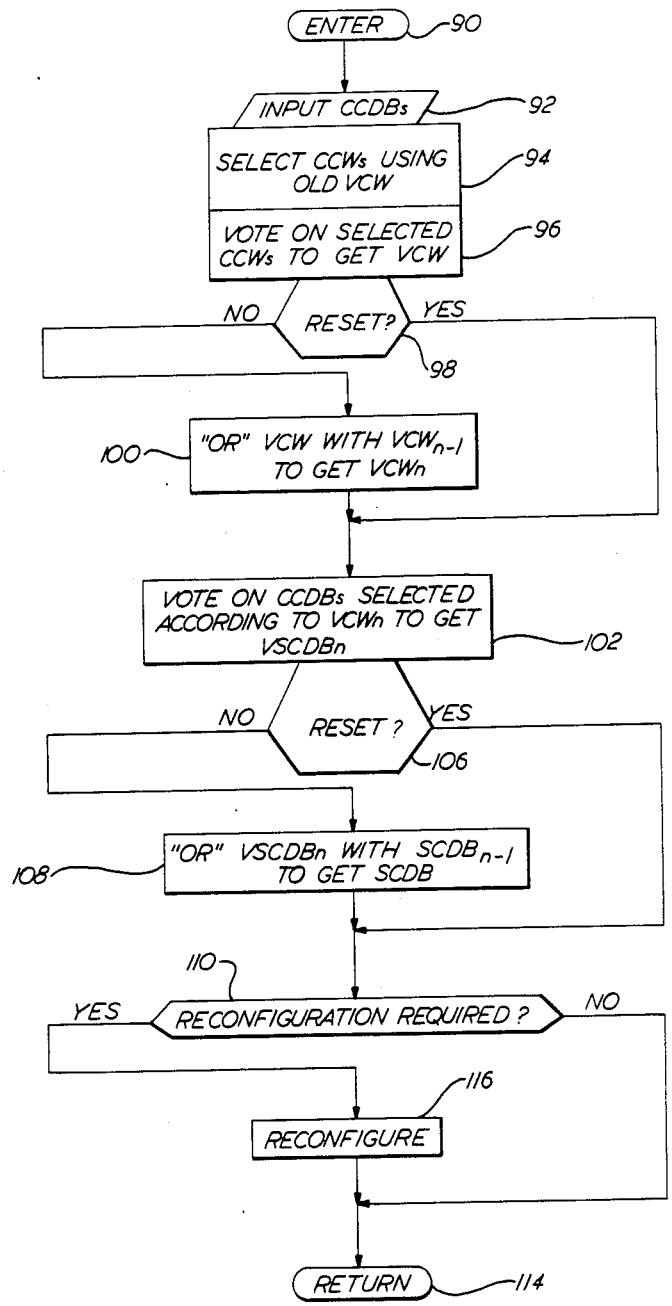
FIG. 3 is a simplified flow chart illustration of a symmetrization process in a channel, according to the present invention.

FIG. 3 is a block diagram flow chart illustration of a series of logical steps which may be executed, according to the present invention, to symmetrize a multichannel system. The flow chart of FIG. 3 is similar to the process described in FIG. 2. After executing an enter step 90, the signal values contained in each of the CCDBs are input to a channel in a step 92. A selection is then made in a step 94 as to which of the CCWs from each of the CCDBs are to be used in the CCW vote. After the CCWs on lines 52, 54, 56, 58 of FIG. 2 are selected for voting, they are voted in a step 96. A step 98 next determines whether a reset has been actuated. If not, a step 100 is next executed, in which the VCW is ORed with the old VCW (from the previous cycle) to obtain the present VCW. If so, a step 102 is directly executed in which the CCDBs selected according to the $VCW_n$ are voted in a voting block 50 as shown in FIG. 2.

If a reset has not been actuated, as indicated in a step 106, the VSCDB is ORed, in a step 108 with the SCDB from the previous cycle to obtain the present SCDB. If a reset had been acctuated, the SCDB is allowed to be upgraded as determined by a majority vote of the selected CCDBs. In the case of a reset condition, neither steps 100 nor 108 are executed as normally executed since it is desired to start from some predefined initial condition different from the immediate past history. Thus, steps 100 and 108 are bypassed so as to start from this desired initial condition.

A determination is next made in a step 110 as to whether reconfiguration is required. If not, a return is made in a step 114 and, if so, reconfiguration is accomplished in a step 116 before returning in step 114.

Equalization is not illustrated in FIG. 3 but may easily be inserted before step 108 so that the suspected channel can be equalized with the "healthy" channels and a selected number of additional cycles can be permitted before forcing reconfiguration in steps 110 and 116.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A symmetrization method, comprising the steps of:
    storing, in each channel of a plural channel system, an associated local channel configuration data base (CCDB) indicative both of fault and redundancy status of signals and channels in said system;
    updating of each local CCDB at random with configuration data from its associated channel;
    storing, in each channel, a plurality of foreign CCDBs, each corresponding to associated local CCDBs in each of the other channels, said step of storing including the step of storing, in each channel, a duplicate of its associated local CCDB;
    periocially updating each of said plurality of foreign CCDBs including said duplicate of said associated local CCDB, in each channel, from configuration data obtained from corresponding local CCDBs in said other channels, said periodic updating of each duplicate CCDB in each channel being made from its associated local CCDB;
    periodically voting, in each channel, said configuration data presently existing in each foreign and duplicate local CCDB in a channel;
    deeming valid only those signals in which said periodically voted foreign and local CCDB signal data are identical and which were and are both previously and presently voted valid;

deeming valid only those channels both previously and presently voted valid; and providing, in each channel, a system configuration data base (SCDB) indicative of said identity of foreign CCDBs and said duplicate local CCDB both previously and presently valid, which SCDB is identical, at substantially all times, to each SCDB in each other channel presently deemed valid.

2. The method of claim 1, further comprising the step of reconfiguring said plural channel system to include only those channels voted valid both previously and presently.

3. The method of claim 1, further comprising the step of equalizing one or more of said signals in said plural channel system, said step of equalizing being executed after determining that one or more channels have signal data deemed invalid, said step of equalizing comprising making said signal data deemed invalid the same as those redundant signals deemed valid and, after a selected number of periodic votes and equalizations in which said signal data in said one or more channels continues to be deemed invalid, reconfiguring said plural channel system to include only said redundant signals deemed valid.

4. The method of claim 1, wherein said step of periodically updating each of said plurality of foreign CCDBs including said duplicate of said associated local CCDB, in each channel, is accomplished substantially at the same relative time within each frame of a repetitive series of synchronized computational time frames common to all channels.

5. The method of claim 1, wherein said step of periodically voting, in each channel, is accomplished substantially at the same relative time within each frame of a repetitive series of synchronized computational time frames common to all channels.

6. The method of claim 1, wherein said step of updating is made, in each channel, by communicating the present signal data content of its local CCDB externally to all the other channels for storage in said foreign CCDBs and also routing said local CCDB's content back into its originating channel via a route similar to that used to communicate the present signal data content of local CCDBs to foreign channels.

7. The method of claim 1, further comprising the step of providing, from each channel in which a loss of power signal occurs, a loss of power signal to all of said plural channels in said system in order that the affected channel's associated foreign CCDB in the unaffected channels may be stopped from affecting the unaffected channels' CCDBs.

8. The method of claim 1, further comprising the step of providing an externally actuated reset signal for upgrading said plural channel system to include selected channels previously deemed invalid.

9. Symmetrization apparatus, comprising:

means for storing, in each channel of a plural channel system, an associated local channel configuration data base (CCDB) indicative both of present fault and redundancy status of signals and channels in said system;

means for updating each local CCDB at random with configuration data from its associated channel;

means for storing, in each channel, a plurality of foreign CCDBs, each corresponding to associated local CCDBs in each of the other channels, said means for storing a plurality of foreign CCDBs including means for storing, in each channel, a duplicate of its associated local CCDB;

means for periodically updating each of said plurality of foreign CCDBs, including said duplicate of said associated local CCDB, in each channel, from configuration data obtained from corresponding local CCDBs in said other channels, said means for periodically updating said plurality of foreign CCDBs including said duplicate of said associated local CCDB in each channel being made from its associated local CCDB;

means for periodically voting, in each channel, said configuration data presently existing in each foreign CCDB and duplicate local CCDB;

means for deeming valid only those signals in which said periodically voted foreign and local CCDB signal data are identical and which were and are both previously and presently voted valid;

means for deeming valid only those channels both previously and presently voted valid; and means for providing, in each channel, a system configuration data base (SCDB) indicative of said identity of foreign CCDBs and said duplicate local CCDB both previously and presently valid, which SCDB is identical, at substantially all times, to each SCDB in each other channel presently deemed valid.

10. The apparatus of claim 9, further comprising means for reconfiguring said plural channel system to include only those majority of channels deemed valid.

11. The apparatus of claim 9, further comprising means for equalizing one or more of said signals in said plural channel system, said equalizing being executed after determining that one or more channels have signal data deemed invalid, said equalizing comprising making said signal data deemed invalid the same as those redundant signals deemed valid and, after a selected number of periodic votes and equalizations in which said signal data in said one or more channels continues to be deemed invalid, reconfiguring said plural channel system to include only said redundant signals deemed valid.

12. The apparatus of claim 9, wherein said means for updating includes means for updating substantially at the same relative time, in each channel, within each frame of a repetitive series of synchronized computational time frames common to all channels.

13. The apparatus of claim 9, wherein said means for voting, in each channel, accomplished said voting substantially at the same relative time within each frame of a repetitive series of synchronized computational time frames common to all channels.

14. The apparatus of claim 9, wherein said means for updating, in each channel, includes means for communicating the present signal data content of its local CCDB along an external signal data route to all the other channels for storage in said foreign CCDBs and also routing said local CCDB's signal data content out of and back into its originating channel via a signal data route similar to that used to communicate the present data content of local CCDBs to foreign channels.

15. The apparatus of claim 9, further comprising means for providing a loss of power signal from any channel which loses power to all the other channels in said system such that said other channels may not use the affected channel's associated foreign CCDB in each other channel.

16. The apparatus of claim 9, further comprising means responsive to an externally actuated reset signal for upgrading said plural channel system to include selected channels previously deemed invalid.

* * * * *

UNITED STATES PATENT AND TRADEMARK OFFICE
CERTIFICATE OF CORRECTION

PATENT NO. : 4,774,709

DATED : 9/27/88

INVENTOR(S) : Bhalchandra R. Tulpule et al

It is certified that error appears in the above-identified patent and that said Letters Patent is hereby corrected as shown below: Title page:

After the WIPO Country Code (INID Code [19]), cancel "Tulplue" and substitute -- Tulpule --

After "Inventors:" (INID Code [75]), cancel "Bhalchandra R. Tulplue" and substitute -- Bhalchandra R. Tulpule --

Column 1, line 16.  Cancel "10/2/88" and substitute -- 10/2/86 --

Signed and Sealed this

Seventh Day of March, 1989

Attest:

DONALD J. QUIGG

*Attesting Officer*  *Commissioner of Patents and Trademarks*